United States Patent Office.

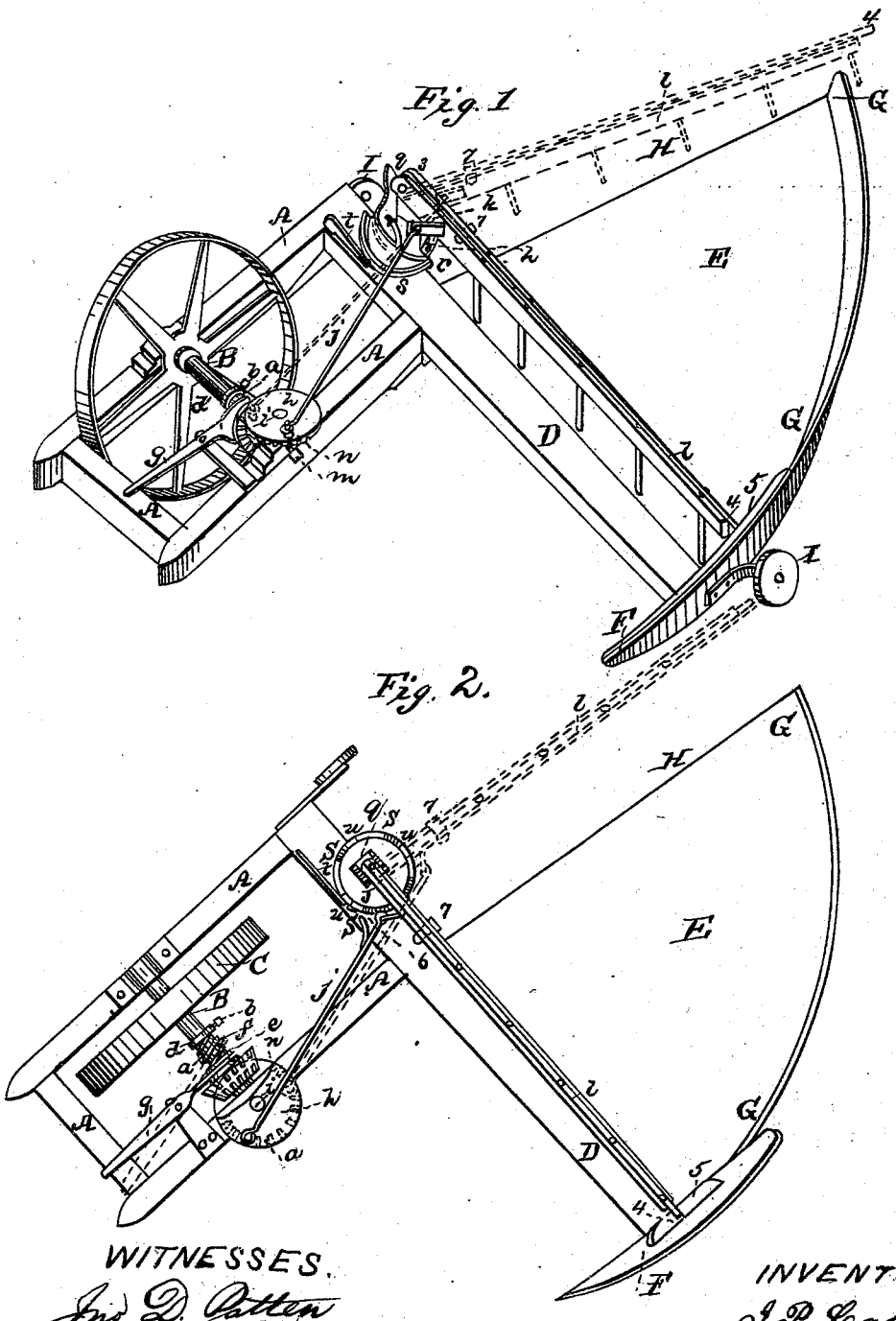

ISAAC P. CADMAN, OF MENDOTA, ILLINOIS, ASSIGNOR TO HIMSELF AND JAMES AIKEN, OF SAME PLACE.

Letters Patent No. 72,163, dated December 17, 1867.

---

IMPROVEMENT IN HARVESTER-RAKES.

---

The Schedule referred to in these Letters Patent and making part of the same.

---

TO ALL WHOM IT MAY CONCERN:

Be it known that I, ISAAC P. CADMAN, of Mendota, in the county of La Salle, and State of Illinois, have invented certain new and useful Improvements in Self-Acting Rakes for Harvesting-Machines; and I do hereby declare the following to be a full, clear, and exact description of the same, reference being had to the accompanying drawings, making a part of this specification, in which—

Figure 1 represents in perspective my rake, applied to so much of a harvesting-machine as will fully illustrate its position and operation.

Figure 2 represents a top plan of the same.

Similar letters of reference, where they occur in the separate figures, denote like parts of the machine and raking-apparatus in both of the drawings.

My invention consists, first, in so combining the rake with the cam-wheel which gives it its rising and falling motion as that the rake shall move with the cam-wheel in clearing the platform or grain-table, and independent of it when it returns for the next clearing or raking operation; and it further consists in a holding-arm, working in conjunction with the rake.

To enable others skilled in the art to make and use my invention, I will proceed to describe the same with reference to the drawings.

A represents the main frame of a harvesting-machine, supported on the axle B of the carrying and driving-wheel C. D is the finger-bar; E, the platform or grain-table; F, the outside divider; and G, the fence or marginal board of the platorm, to prevent the grain from leaving the platform, as it is moved around by the rake, until it arrives at the delivery-edge or side H thereof. I I are small supporting-wheels, for carrying the rear portion of the machine, and keeping it off the ground. Upon the axle or shaft B there is placed a sleeve, $a$, which can be adjusted thereon, and, when adjusted, is held rigidly thereto (and turns with said axle or shaft) by a set-screw, $b$. Upon this sleeve $a$ is placed loosely a wheel or hub, $c$, having a series of bevel-cogs, 1 2, of different diameters, formed thereon; and between this wheel or hub $c$ and the collar $d$, on the end of the sleeve $a$, there is a clutch, $e$, which is held in action by the spring $f$, to compel the hub or wheel $c$ to turn with the sleeve $a$, and with the axle or shaft B, but which can be thrown out of action at pleasure by the clutch-lever $g$. A crown-wheel, $h$, is arranged upon a vertical shaft, $i$, which wheel and shaft may be adjusted vertically by means of the set-screw $m$, so that when the sleeve $a$ or wheel $c$ is moved along on the shaft B, to bring any special one of the series of cogs upon it into working position with the crown-wheel $h$, the latter may be raised or lowered, as the case may be, to work in gear with that special one of the series. On the crown-wheel $h$ there is a wrist-pin, $n$, to which one end of the connecting-rod $j$ is fastened, the other end of said rod being attached, by a link or loop, $k$, to the rake-head $l$, near its heel, where it is pivoted to the post $o$. A cam-wheel, J, having four cam planes upon it, is arranged to move around the post or pivot $o$ as a centre, and upon the under side of the rake-head $l$, and at its rear, there is a downward projection, $p$, that rides upon or over one of the cam-planes in returning, to clear the platform a second time, and which takes against another portion of said plane, to move the wheel J, with itself, whilst clearing the platform. A spring, $q$, at the end of the rake-head, is compressed, by the rake-head pressing against it, as it rides up one of the planes upon the wheel J, and when it passes over the highest point of said cam-plane, the recoil of the spring forces down the rake on to the platform. Upon the projection $p$ there is a hooked arm, $r$, which, when or a little after the rake falls, takes under a flange, $s$, on the cam-wheel J, and prevents the rake from rising. A spring-dog, $t$, takes into notches or behind ratchet-shoulders $u$, to hold the wheel J still whilst the rake is coming back for the next raking operation.

It will be readily perceived how the rake gets its circular reciprocating motion from the crank or crown-wheel $h$. Its rising and falling motion I will explain. When the rake has completed its sweep, having moved the cam-wheel with it a quarter revolution, the spring $t$ drops behind one of the shoulders $u$. The rake then begins to move forward for another operation, but the wheel is held from moving with it by the spring $t$. As the rake moves forward, its projection, $p$, mounts the cam-plane, and of course the rake rises accordingly, and high enough to prevent it from interfering with the falling grain. When the projection $p$ passes the apex of the plane, the spring $q$ forces down the rake on to the platform, and the projection $p$ then taking against a side of the cam-plane, and its hook catching under the flange *s*, it cannot ride up or rise, and sweeps off the platform, carrying the wheel J around with itself until the gavel is delivered, and the spring-dog catches and holds the wheel, and the rake returns for another succeeding similar operation.

It is obvious that this rake and mechanism can be applied to a two-wheeled machine, or to a flexible or yielding-bar machine, as the rod *j* is like a link motion, and yielding; and the series of rows of bevel-gears, instead of being on the wheel *c*, may be concentrically arranged on the under side of the crown-wheel *h*, and answer the same purpose.

A stud, 3, is arranged on the rake-head *l*, on which is pivoted a holding-arm, 4, said arm being somewhat longer than the rake-head, so that its extreme outer point may drop and rest upon a projection, 5, on the outer shoe or divider F. A bent arm, 6, on the connecting-rod *j*, moves the holding-arm, starting it after the rake has moved some distance. A projection, 7, on the rake-head, catches and brings back the arm 4 as it returns. The object of the arm 4 is to hold the falling grain until the rake passes from under it, and thus to prevent the falling grain from being entangled with that being raked off.

Having thus fully described my invention, what I claim therein as new, and desire to secure by Letters Patent, is—

So combining a circular reciprocating rake with the cam-wheel which gives it its rising and falling motion as that the rake shall move said wheel when it clears the platform, and without it when it returns for the next sweeping or clearing operation, substantially as described.

I also claim, in combination with the sweep-rake, the pivoted holding-arm 4, acting in conjunction with it, as and for the purpose described.

ISAAC P. CADMAN.

Witnesses:
CALEB WALKER,
J. C. CROOKER.